(12) United States Patent
Pottish et al.

(10) Patent No.: US 7,686,187 B2
(45) Date of Patent: Mar. 30, 2010

(54) APPARATUS AND METHOD FOR OPEN THREAD, REUSABLE, NO-WASTE COLLAPSIBLE TUBE DISPENSERS WITH CONTROL RIBS AND/OR DETENT

(75) Inventors: Susan Pottish, P.O. Box 1555, Ukiah, CA (US) 95482; Scott Virden Anderson, Ukiah, CA (US)

(73) Assignees: Scott V. Anderson, Ukiah, CA (US); Susan Pottish, Ukiah, CA (US)

( * ) Notice: Subject to any disclaimer, the term of this patent is extended or adjusted under 35 U.S.C. 154(b) by 72 days.

(21) Appl. No.: 11/677,571

(22) Filed: Feb. 21, 2007

(65) Prior Publication Data

US 2007/0131712 A1 Jun. 14, 2007

Related U.S. Application Data

(60) Provisional application No. 60/775,752, filed on Feb. 21, 2006.

(51) Int. Cl.
*B65D 35/00* (2006.01)
*B65D 6/00* (2006.01)
*B65B 7/28* (2006.01)

(52) U.S. Cl. .................. 222/107; 222/212; 220/646; 220/666; 215/43; 215/900

(58) Field of Classification Search .............. 222/92, 222/105, 107, 212; 220/605, 634, 656, 657, 220/658, 646, 666, 256.1, 259.3; 215/42, 215/43, 900

See application file for complete search history.

(56) References Cited

U.S. PATENT DOCUMENTS

| 1,269,483 | A | * | 6/1918 | Miller | 222/107 |
| 3,236,420 | A | * | 2/1966 | Leika | 222/146.3 |
| 3,939,888 | A | * | 2/1976 | Scarnato | 220/666 |
| 3,946,903 | A | * | 3/1976 | Parker | 222/92 |
| 5,417,337 | A | * | 5/1995 | Robbins, III | 220/8 |
| 5,900,293 | A | * | 5/1999 | Zettle | 428/12 |
| 6,279,780 | B1 | * | 8/2001 | Rousselet | 222/107 |
| 7,204,381 | B2 | * | 4/2007 | Vincent et al. | 215/44 |

* cited by examiner

*Primary Examiner*—Kevin P Shaver
*Assistant Examiner*—Stephanie E Tyler
(74) *Attorney, Agent, or Firm*—Earle Jennings

(57) ABSTRACT

At least one collapsible tube for containing at least one product, comprising: external flexible thread form on flexible throat coupled to flexible shoulder. The flexible throat and flexible shoulder flatten to dispense essentially all the contained product. The flexible shoulder may include a raised detent for stopping a cap and/or raised flexible ribs to control the direction of flattening the flexible shoulder. At least one cap for the collapsible tube including an interior bulge or an interior rim, both for urging an included interior thread form to engage with an external flexible thread form included in the flexible throat, and further including a lower surface to engage with the raised detent, and/or internal ribs and/or internal posts to engage with the raised flexible ribs. Manufacturing methods for the collapsible tubes and caps, and these items as products of the manufacturing processes.

23 Claims, 10 Drawing Sheets

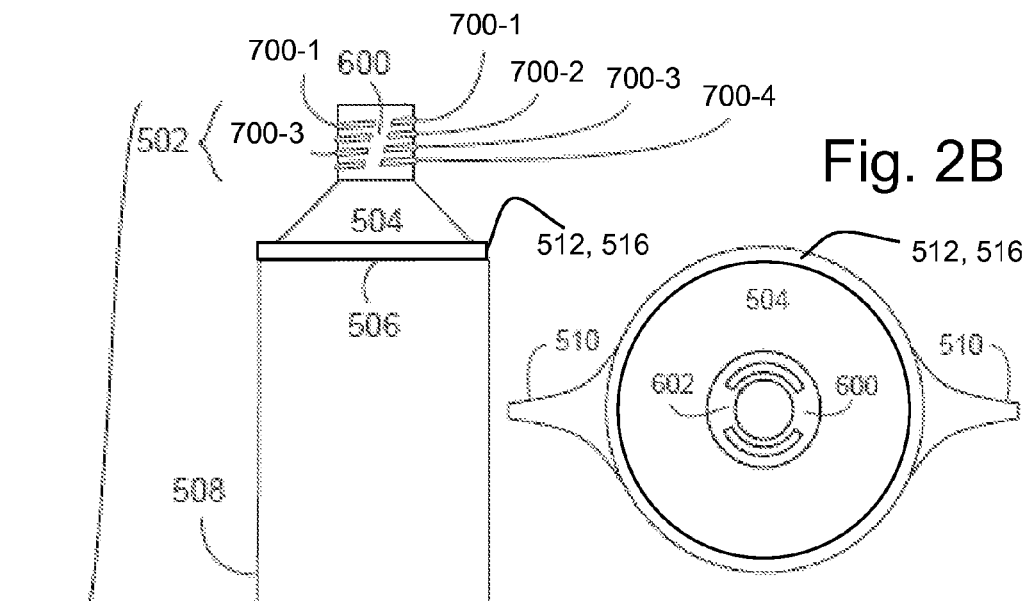
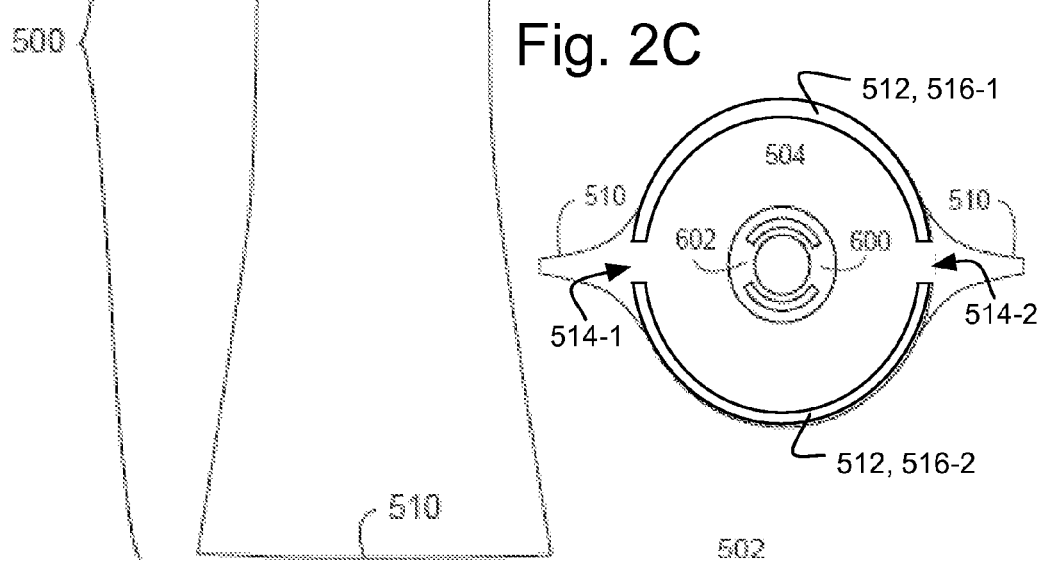
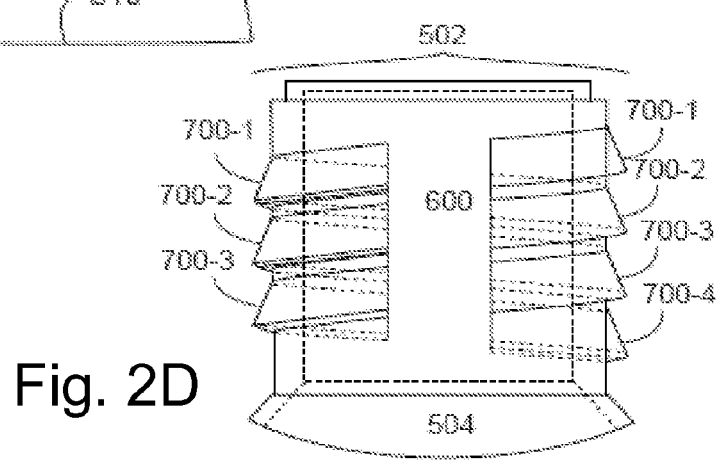
Fig. 2A
Fig. 2B
Fig. 2C
Fig. 2D

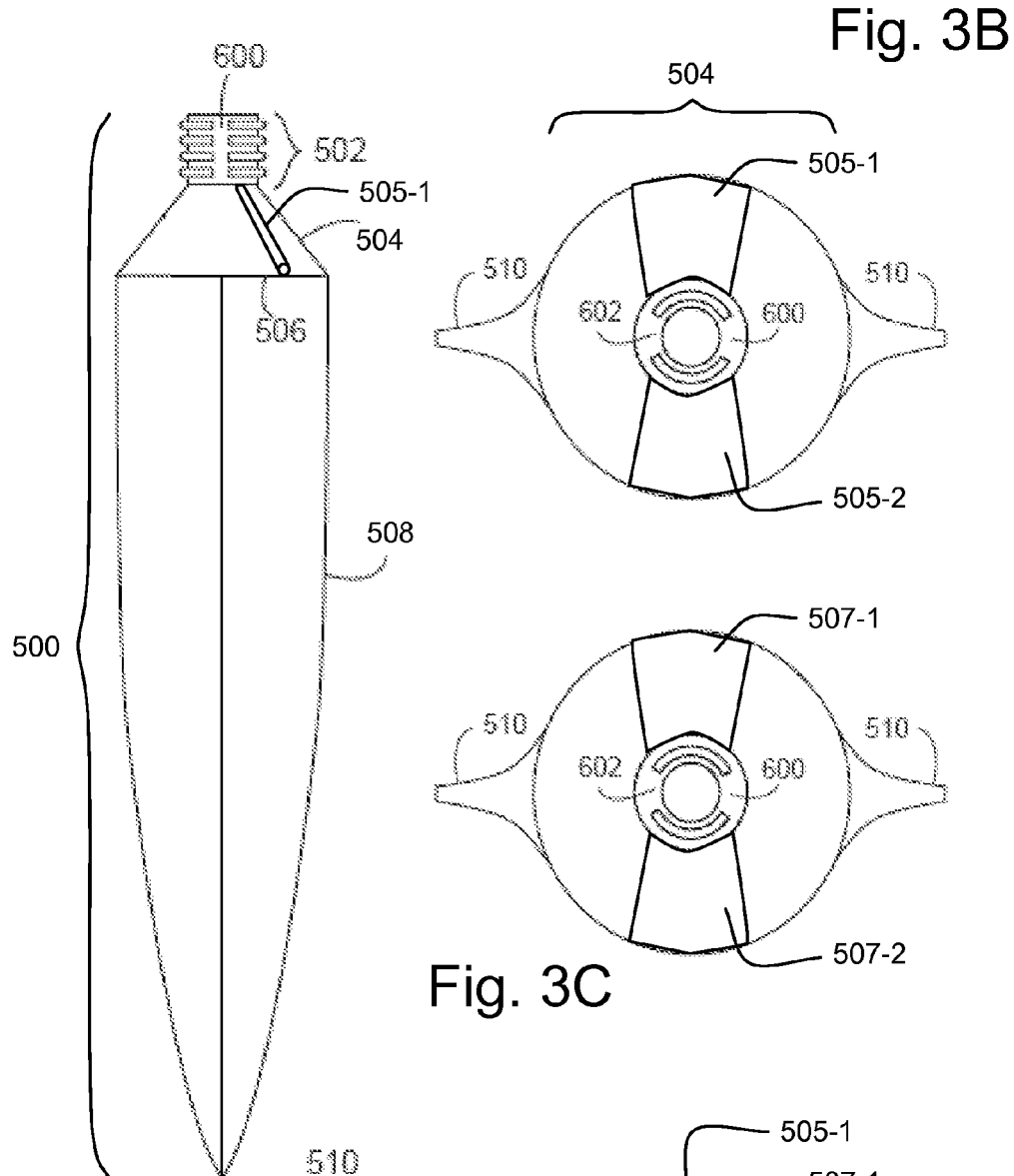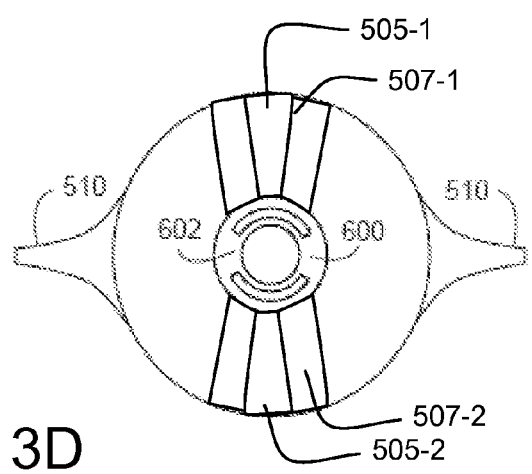

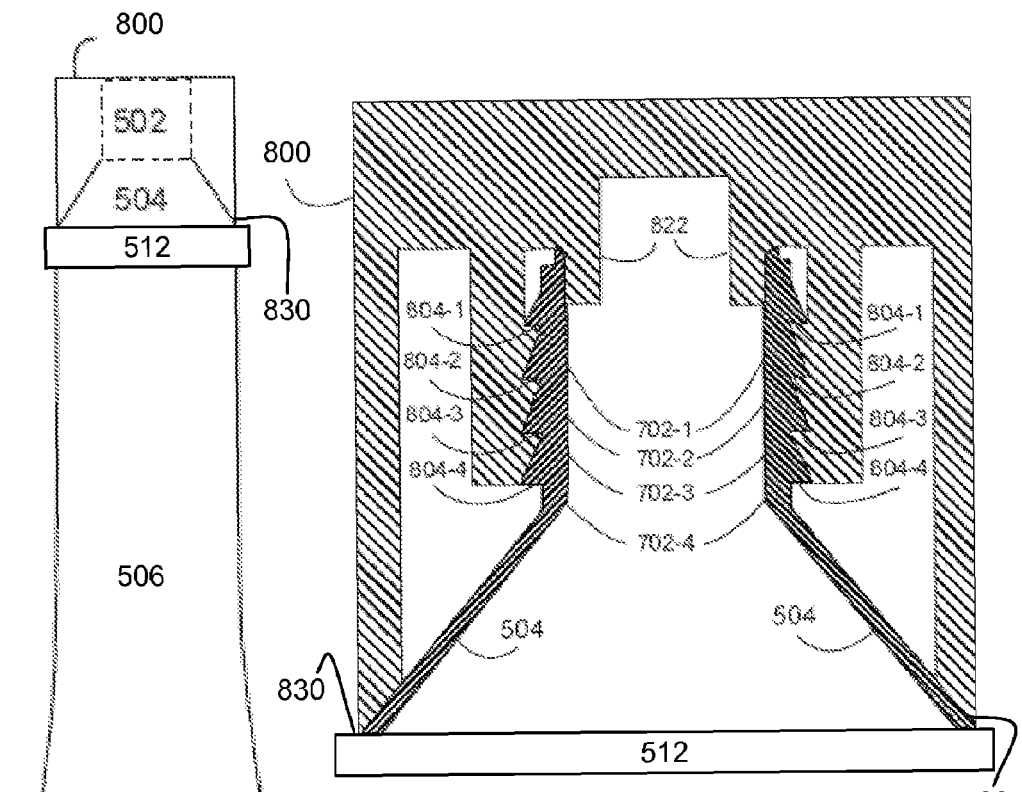
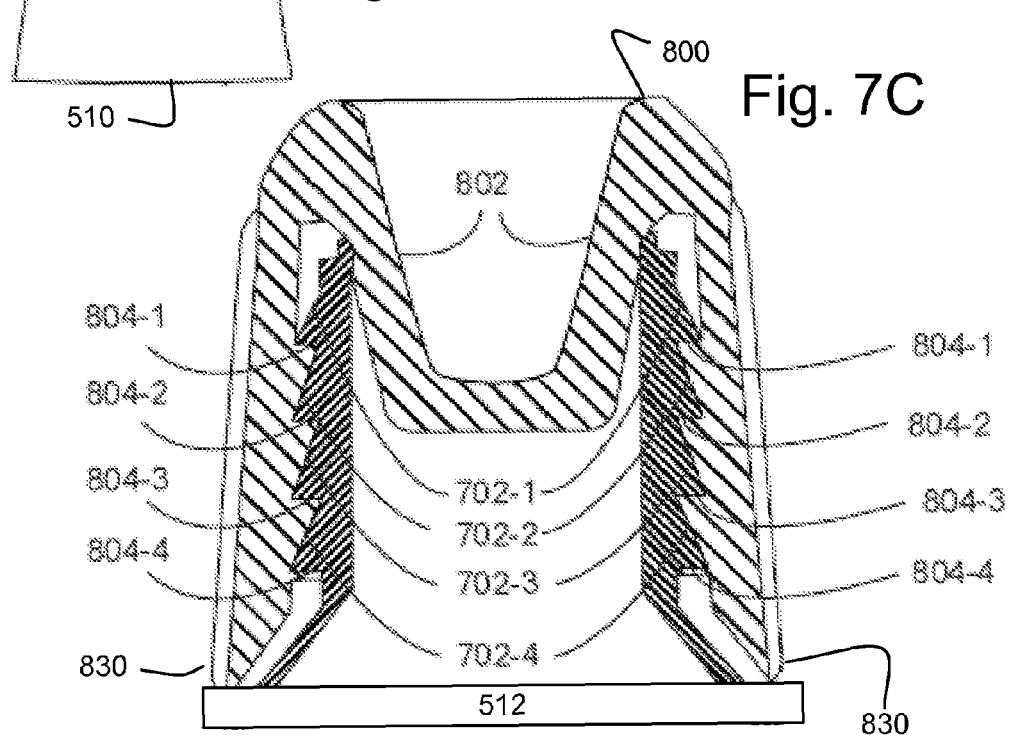
Fig. 7A
Fig. 7B
Fig. 7C

Fig. 9A
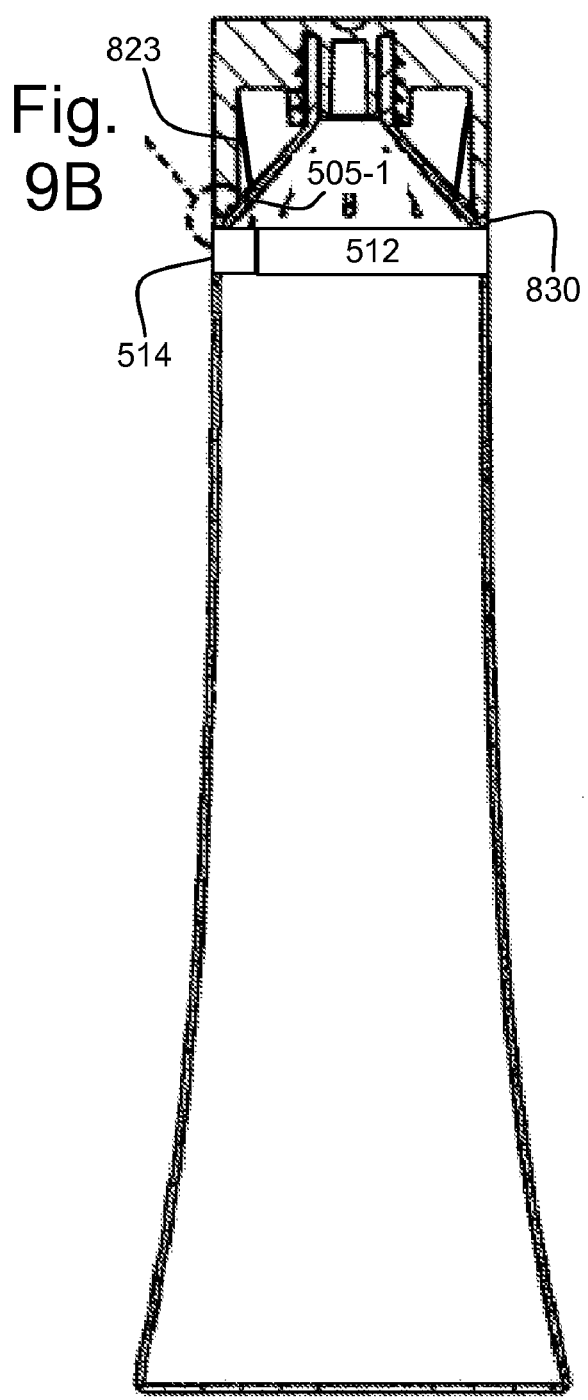
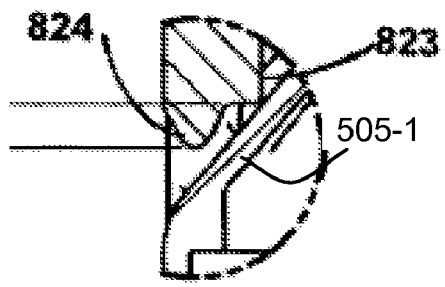
Fig. 9B

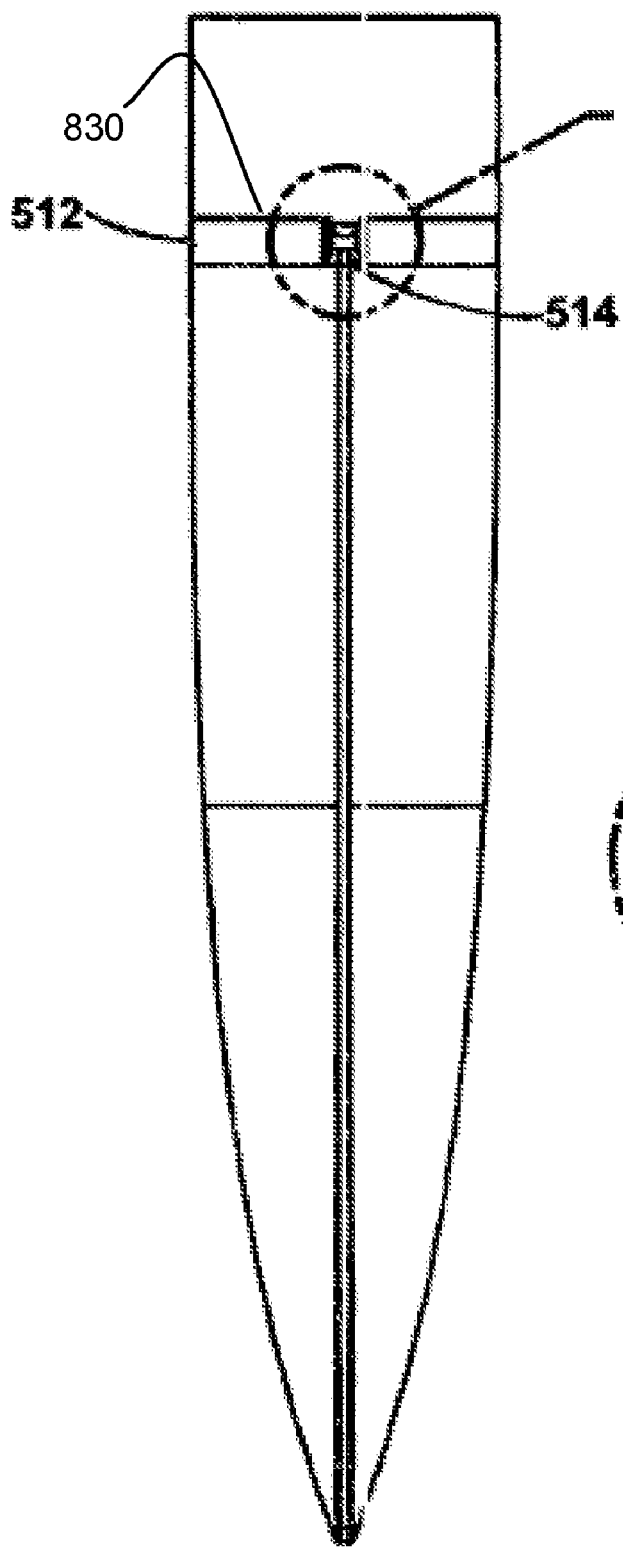
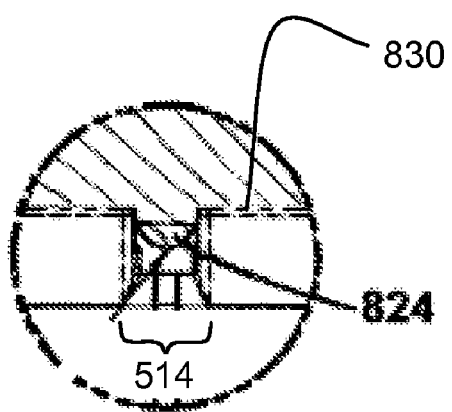

APPARATUS AND METHOD FOR OPEN THREAD, REUSABLE, NO-WASTE COLLAPSIBLE TUBE DISPENSERS WITH CONTROL RIBS AND/OR DETENT

CROSS REFERENCE TO RELATED APPLICATIONS

This application claims priority to Provisional Application 60/775,752 filed Feb. 21, 2006, and is a continuation-in-part of U.S. application Ser. Nos. 10/928,676 filed Aug. 26, 2004 and 10/928,957 also filed Aug. 26, 2004, all of which are incorporated herein by reference.

BACKGROUND OF THE INVENTION

1. Field of the Invention

The invention relates to open thread screw and cap mechanisms with particular application to forming collapsible tube dispensers.

2. Background Information

This application is a continuation in part of two applications previously filed for the applicants disclosing reusable, collapsible tube dispensers. While the earliest collapsible tube dispensers in the US patent database date from the early nineteenth century, there were problems reported with the prior art which the previous applications addressed, namely:

The prior art collapsible tubes do not lend themselves both to being reusable and supporting the complete, controlled dispensing of their contents. As the term is used herein, reusable will refer to the capability to dispense small, or controlled, portions of the contents multiple times, perhaps on different occasions. Reusable may further refer to the capability to refill the contents multiple times. And reusable may further refer to a container, which can be cleaned, and refilled with differing contents.

With the exception of some one-time use containers, prior art collapsible tube dispensers typically possess a rigid shoulder and a rigid throat. The rigid throat provides an exterior, rigid screw. This exterior rigid screw mates with a cap providing a matching interior screw pattern. When the cap is screwed onto the exterior screw of the throat, a seal is formed, which seals in the contents of the collapsible tube.

There are several terms which will be used herein:

Personal care products include, but are not limited to, cosmetics, facial care products, skin care products, over-the-counter health products, and/or hair care products.

Open thread screws have threads that taper away from the body, or remain of constant thickness. Up until the parent applications, using these open thread screws required that the throat and the threads of a collapsible tube be essentially rigid. An essentially rigid throat on a collapsible tube dispenser virtually guarantees that some of the tube contents will not readily leave the tube, causing the tube to waste some of its contents. The rigid shoulder further guarantees this waste.

FIG. 1A shows a prior art exterior screw 20 with a prior art external flexible thread form 22. The prior art external flexible thread form 22 is shown in an expanded view through the following examples shown in FIGS. 1B and C with a matching internal thread form 24.

There is a local coordinate system in FIG. 1A, which will be used throughout this document. The z axis 10 extends through the center of the cylinder of the prior art exterior screw 20, and is the central axis of the cylinder. The r axis 12 is the radial direction of the thread at a point, which, for the sake of discussion, is referred to as thread point 22 in FIG. 1A. The n axis 14 is normal to the thread point 22. When the screw is turned in the n direction, it engages more of the threads.

The engagement of an exterior screw thread and matching interior screw is shown in the expanded view of the prior art open screw thread 22 in FIG. 1A. The expanded view is a cross-section of the threads taken in the plane of the z axis 10 and the r axis 12.

FIG. 1B shows an example of FIG. 1A using a standard acme thread for the external flexible thread form 22 and the matching internal thread form 24. A first external acme thread 22-1 matches the first internal acme thread 24-1. A second external acme thread 22-2 with the second internal acme thread 24-2.

FIG. 1C shows an example of FIG. 1A using a standard buttress thread for the external flexible thread form 22 and the matching internal thread form 24. A first external buttress thread 22-3 matches the first internal buttress thread 24-3. A second external buttress thread 22-4 with the second internal buttress thread 24-4.

FIG. 1D shows an example of FIG. 1A using a box thread for the external flexible thread form 22 and the matching internal thread form 24. A first external box thread 22-5 matches the first internal box thread 24-5. A second external box thread 22-6 with the second internal box thread 24-6. One skilled in the art will recognize that FIGS. 1B to 1D show some of the many variations in open threads in use today. Other commonly used threads include various "V" shaped threads, as well as variations in angles of the walls, variations in the shape of the peaks and troughs of the threads.

To summarize from the parent applications, what is needed and has been addressed in them are reusable collapsible tubes able to dispense essentially all of its contents.

SUMMARY OF THE INVENTION

In the inventors' experiments with the collapsible tubes disclosed in the parent applications, two problems were found, either or both of which can adversely affect the use of those collapsible tubes. The first problem stems from over tightening the cap, which in certain instances can apply a counter pressure to the flexible throat, causing it to break the seal formed with the cap. The second problem comes from the flexibility of the flexible shoulder, which can be misdirected when squeezed, causing the contained product to be dispensed erratically.

Certain embodiments of the invention include a collapsible tube for containing at least one product, comprising: an external flexible thread form on a flexible throat coupled to a flexible shoulder. The flexible throat and the flexible shoulder flatten to dispense essentially all of the contained product. The external flexible thread form mates with an internal thread form, included in the cap, urging the flexible throat to seal against the cap when the cap is twisted onto the flexible throat. And the external flexible thread form further includes at least two external open threads.

The flexible shoulder may comprise a raised detent near the widest circumference of the flexible shoulder that stops a cap when twisted onto the flexible throat at a final position.

Alternatively, the flexible shoulder may comprise at least two raised flexible ribs to control the flattening of the flexible shoulder in a single direction.

Or the flexible shoulder may comprise both the raised detent for stopping the cap and the raised flexible ribs to control the flattening, which may be preferred in certain situations.

The raised detent may include a raised rim near the widest circumference of the flexible shoulder sufficient to create a barrier to the cap turning beyond when the cap is in the final position.

The raised detent may include at least one gap for engaging with a bump on the cap to create a cue indicating to a user that the final position has been reached.

In embodiments where the flexible shoulder includes raised ribs, the flexible shoulder may include at least two external raised ribs and/or at least two of an internal raised ribs. The number of external or internal raised ribs may be even or odd, and may further be at most twenty four.

Aspects of the invention include manufacturing the collapsible tube with the flexible shoulder including the raised detent by molding a first injected material to create the collapsible tube with the raised detent included in the flexible shoulder. Certain embodiments of the invention include the collapsible tube with the raised detent as a product of this manufacturing process.

Aspects of the invention include manufacturing the collapsible tube with the raised flexible ribs by molding a first injected material to create the collapsible tube with the raised flexible ribs included in the flexible shoulder. Certain embodiments of the invention include the collapsible tube with the flexible ribs as a product of this manufacturing process.

Certain embodiments include a cap for the collapsible tube, including an interior bulge to act upon the flexible throat to urge the flexible throat to engage the internal thread form and the external flexible thread form or an interior rim to act upon the flexible throat to urge the flexible throat to engage the internal thread and the external flexible thread form.

The cap for the collapsible tube with the flexible shoulder including the raised detent may include a lower surface to engage with the raised detent to stop the cap from twisting past the final position.

The cap for the collapsible tube with the flexible shoulder including raised flexible ribs may include an internal rib that snaps over the raised flexible ribs to indicate the cap turning to the final position or an internal post with sufficient length to snap over the raised flexible ribs of the flexible throat as the cap is turned into the final position, producing a cue indicating to the user that the final position has been reached.

Aspects of the invention include manufacturing the cap for collapsible tube with the raised detent on the flexible shoulder by molding a second injected material to create the cap including the lower surface for engaging the raised detent on the flexible shoulder of the collapsible tube. Certain embodiments include the cap with the lower surface as a product of this process.

Other aspects of the invention include manufacturing the cap for the collapsible tube with a flexible shoulder including raised ribs by either molding the second material to create the cap with the internal rib for snapping over the raised flexible ribs or to create the cap with the internal post for snapping over the raised flexible ribs. Either of these caps are products of this process.

Using the collapsible tube permits dispensing essentially all of the contained product, which is advantageous in a variety of fields where today everyone is forced to waste the last part of the contained product. This is valuable in such diverse areas of application as pharmaceuticals, personal care products, paints, toothpaste, foods, glues, hazardous chemicals, viscous plastics, and grease products.

BRIEF DESCRIPTION OF THE DRAWINGS

FIG. 2A shows a side view of a collapsible tube in accord with the invention including a raised detent near the widest circumference of its flexible shoulder;

FIG. 2B shows a top view of the collapsible tube of FIG. 2A including the raised detent and its raised rim;

FIG. 2C shows a top view of an alternative collapsible tube where the raised detent includes a first and second gap separating a first and second raised rim;

FIG. 2D shows an alternative flexible throat for the collapsible tube of FIGS. 2A through 2C;

FIG. 3A shows a side view of a collapsible tube including at least one external raised rib on the flexible shoulder, in accord with the invention;

FIG. 3B shows a top view of a collapsible tube including two external raised ribs in accord with the invention;

FIG. 3C shows a top view of a collapsible tube including two internal raised ribs in accord with the invention;

FIG. 3D shows a top view of a collapsible tube including two external raised ribs and two internal raised ribs in accord with the invention;

FIG. 7A shows a side view of a cap engaged through a lower surface to the raised detent of the collapsible tube in accord with the invention;

FIG. 7B shows a cross section of the cap of FIG. 7A with an interior rim engaging the flexible throat of the collapsible tube;

FIG. 7C shows a cross section of an alternative cap including an internal bulge for engaging the flexible throat, and the lower surface engaging the raised detent of the collapsible tube;

FIGS. 9A and 9B show the cap with an internal post and a bump, where the internal post engages a raised rib and the bump engages a gap in the raised detent of the collapsible tube; and FIGS. 9C and 9D show a cap including the bump engaging a gap in the raised detent included in the collapsible tube.

DETAILED DESCRIPTION

Figure 1A:
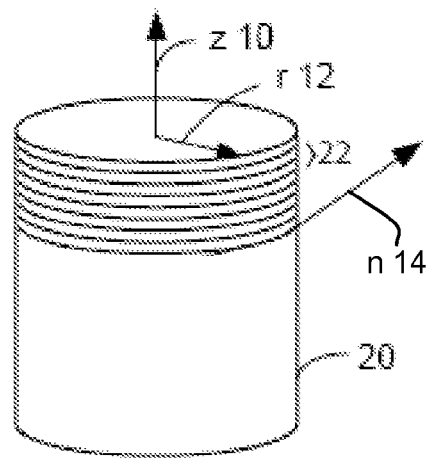
FIG. 1A shows a prior art exterior screw with a prior art external flexible thread form.
Figure 1B:
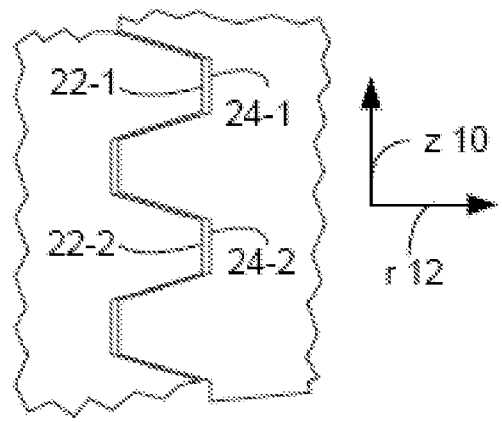
FIG. 1B shows a prior art example of FIG. 1A using a standard acme thread for the external flexible thread form and the matching internal thread form.
Figure 1C:
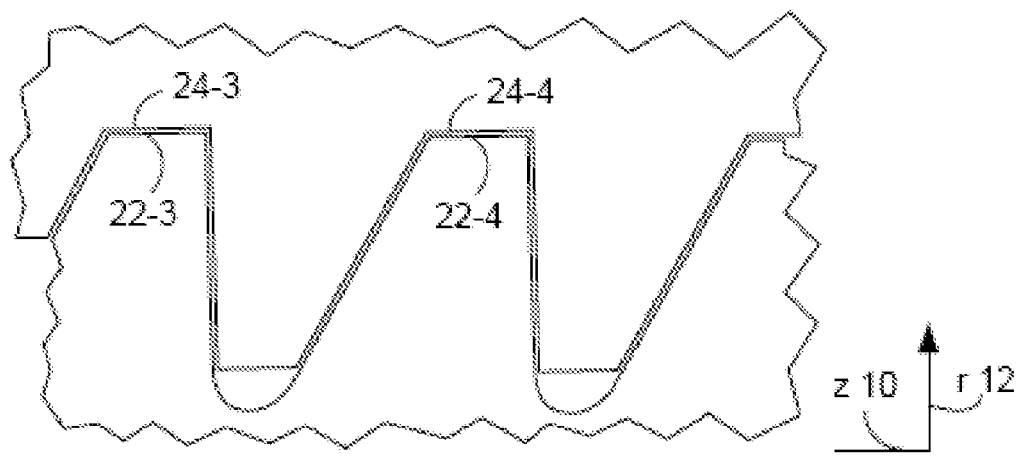
FIG. 1C shows a prior art example of FIG. 1A using a standard buttress thread for the external flexible thread form and the matching internal thread form.
Figure 1D:
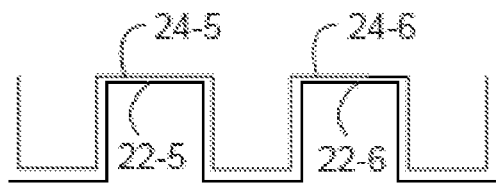
FIG. 1D shows a prior art example of FIG. 1A using a box thread for the external flexible thread form and the matching internal thread form.

The invention relates to open thread screw and cap mechanisms with particular application to forming collapsible tube dispensers.

Certain embodiments of the invention include a collapsible tube 500 for containing at least one contained product 900, comprising: an external flexible thread form on a flexible throat 502 coupled to a flexible shoulder 504, as shown in FIGS. 2A to 5D. The flexible throat and the flexible shoulder flatten to dispense essentially all of the contained product 900, as shown in FIGS. 6A to 6D. The external flexible thread form mates with an internal thread form, included in the cap 800, urging the flexible throat to seal against the cap when the cap is twisted onto the flexible throat. And the external flexible thread form further includes at least two external open threads.

The flexible shoulder 504 may include a raised detent 512 near the widest circumference of the flexible shoulder 504 as shown in FIGS. 2A to 2C, and 5A to 5D. The raised detent stops a cap 800 when twisted onto the flexible throat 502 at a final position as shown in FIGS. 7A to 7C.

Alternatively, the flexible shoulder 504 may comprise at least two raised flexible ribs 505 as shown in FIGS. 3A to 4C. These raised ribs serve to control the flattening of the flexible shoulder 504 in a single direction.

Or the flexible shoulder 504 may comprise both the raised detent 512 for stopping the cap 800 and the raised flexible ribs 505 to control the flattening, which may be preferred in certain situations and is shown in FIGS. 5A to 5D.

The raised detent 512 may include a raised rim 516 near the widest circumference of the flexible shoulder 504 as shown in FIGS. 2A to 2C, 5A to 5D, and 7A to 7C. The raised detent is sufficient to create a barrier to the cap 800 turning beyond when the cap is in the final position. FIGS. 5A and 7A to 7C show the raised detent and its raised rim as creating the widest circumference of the flexible shoulder. FIGS. 2A to 2C and 5B to 5D show the raised rim as part or near the widest circumference.

The raised detent 512 may include at least one gap 514 for engaging with a bump 824 of the cap 800 to create a cue indicating to a user that the final position has been reached as shown in FIGS. 9B to 9D. FIG. 2C shows an example with the raised detent including a first gap 514-1 and a second gap 514-2, separating the first raised rim 516-1 from the second raised rim 516-2.

In embodiments where the flexible shoulder 504 includes raised ribs, the flexible throat may include at least two external raised ribs and/or at least two of an internal raised ribs, as seen in the following examples:

FIG. 3A shows one side of the flexible shoulder 504 including a first external raised rib 505-1.

Figure 5A:
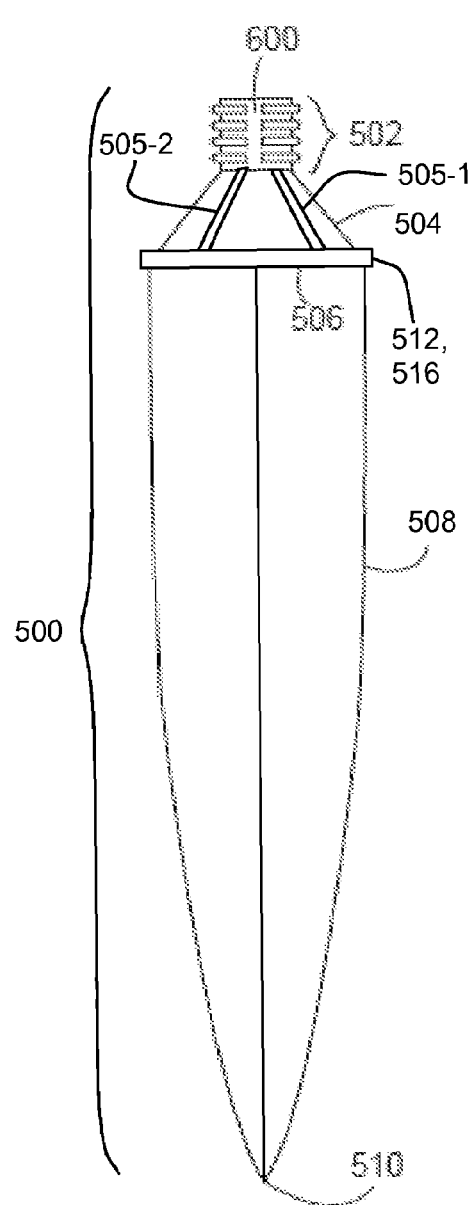
FIG. 5A shows a side view of a collapsible tube including at least one external raised rib and a raised detent on the flexible shoulder, in accord with the invention.
Figure 5B:
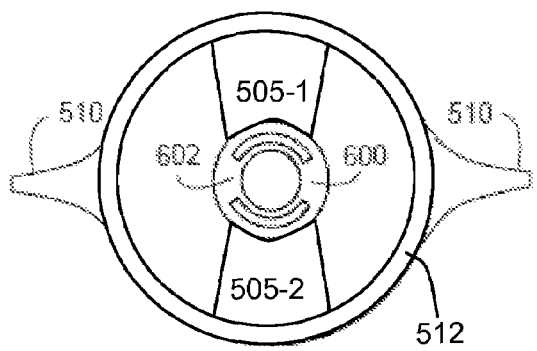
FIG. 5B shows a top view of a collapsible tube including two external raised ribs and a raised detent in accord with the invention.

FIGS. 3B and 5B show the flexible shoulder including a first external raised rib 505-1 and a second external raised rib 505-2.

Figure 5C:
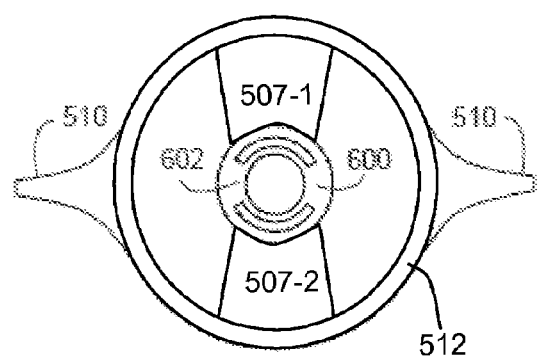
FIG. 5C shows a top view of a collapsible tube including two internal raised ribs and a raised detent in accord with the invention.

FIGS. 3C and 5C show the flexible shoulder including a first internal raised rib 507-1 and a second internal raised rib 507-2.

Figure 5D:
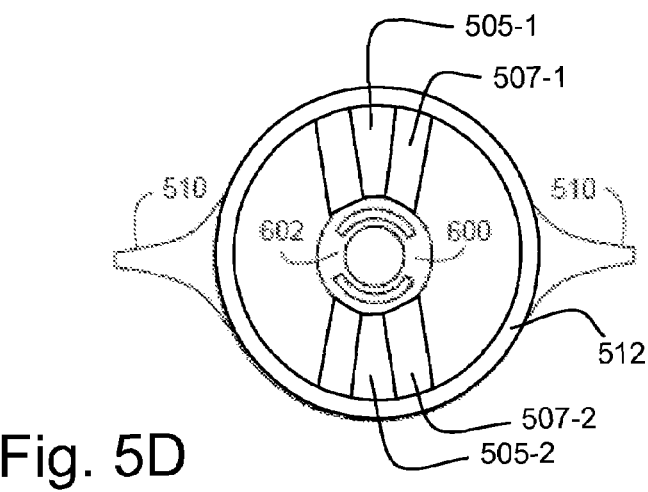
FIG. 5D shows a top view of a collapsible tube including two external raised ribs, two internal raised ribs and a raised detent in accord with the invention.
Figure 6A:
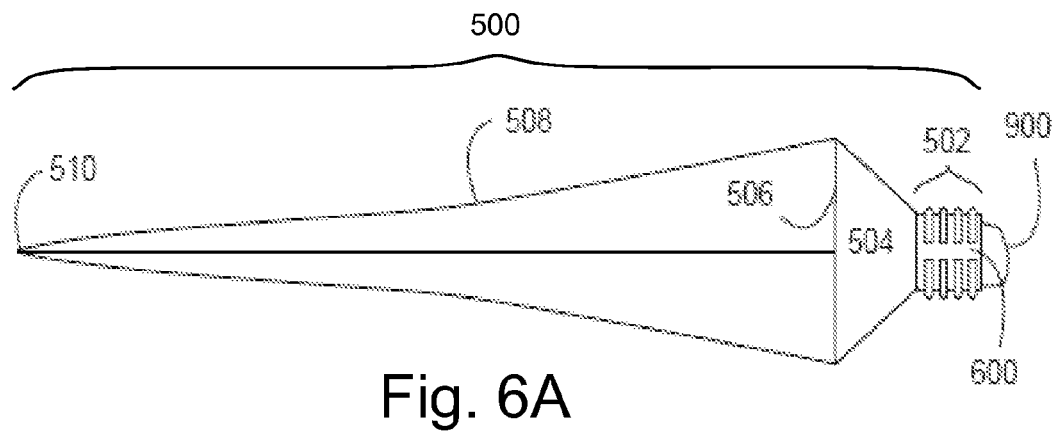
FIGS. 6A to 6D show the side view of the squeezing of the collapsible tube in accord with the invention, with the contained product being dispensed.
Figure 6B:
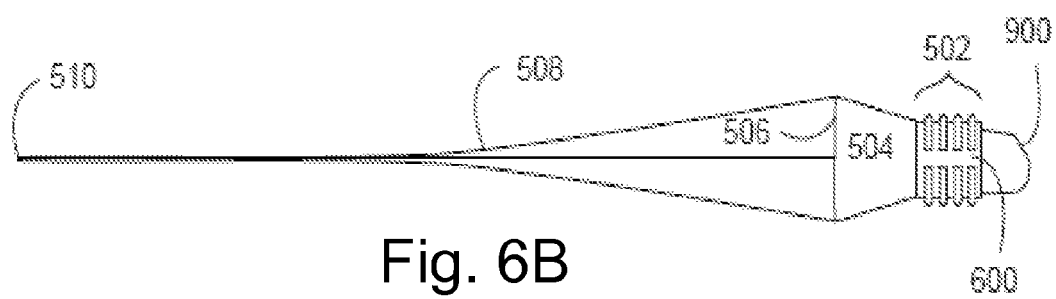
Figure 6C:
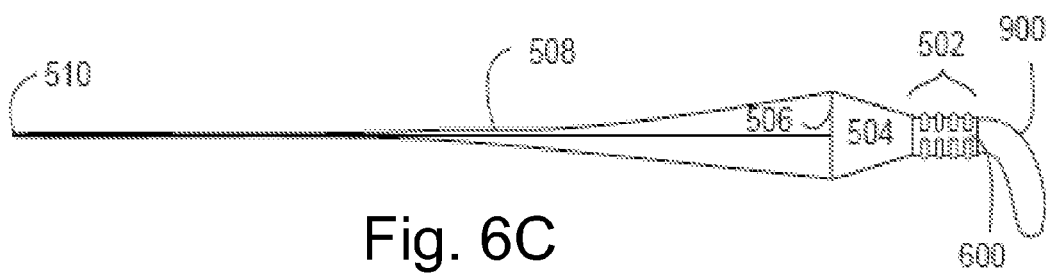
Figure 6D:
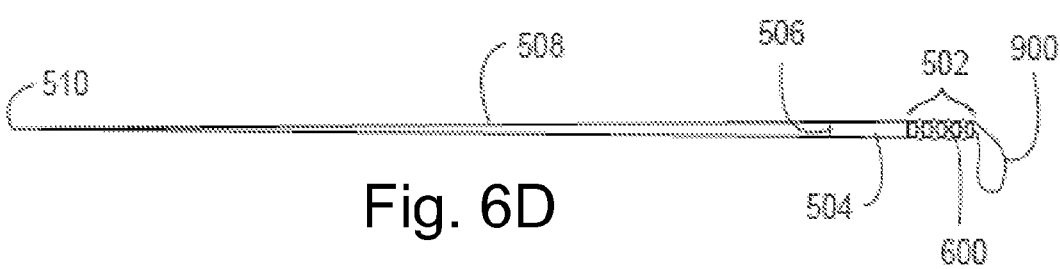

FIGS. 3D and 5D show the flexible shoulder including both a first external raised rib 505-1 and a second external raised rib 505-2, as well as a first internal raised rib 507-1 and a second internal raised rib 507-2.

Figures 4A, 4B, 4C:
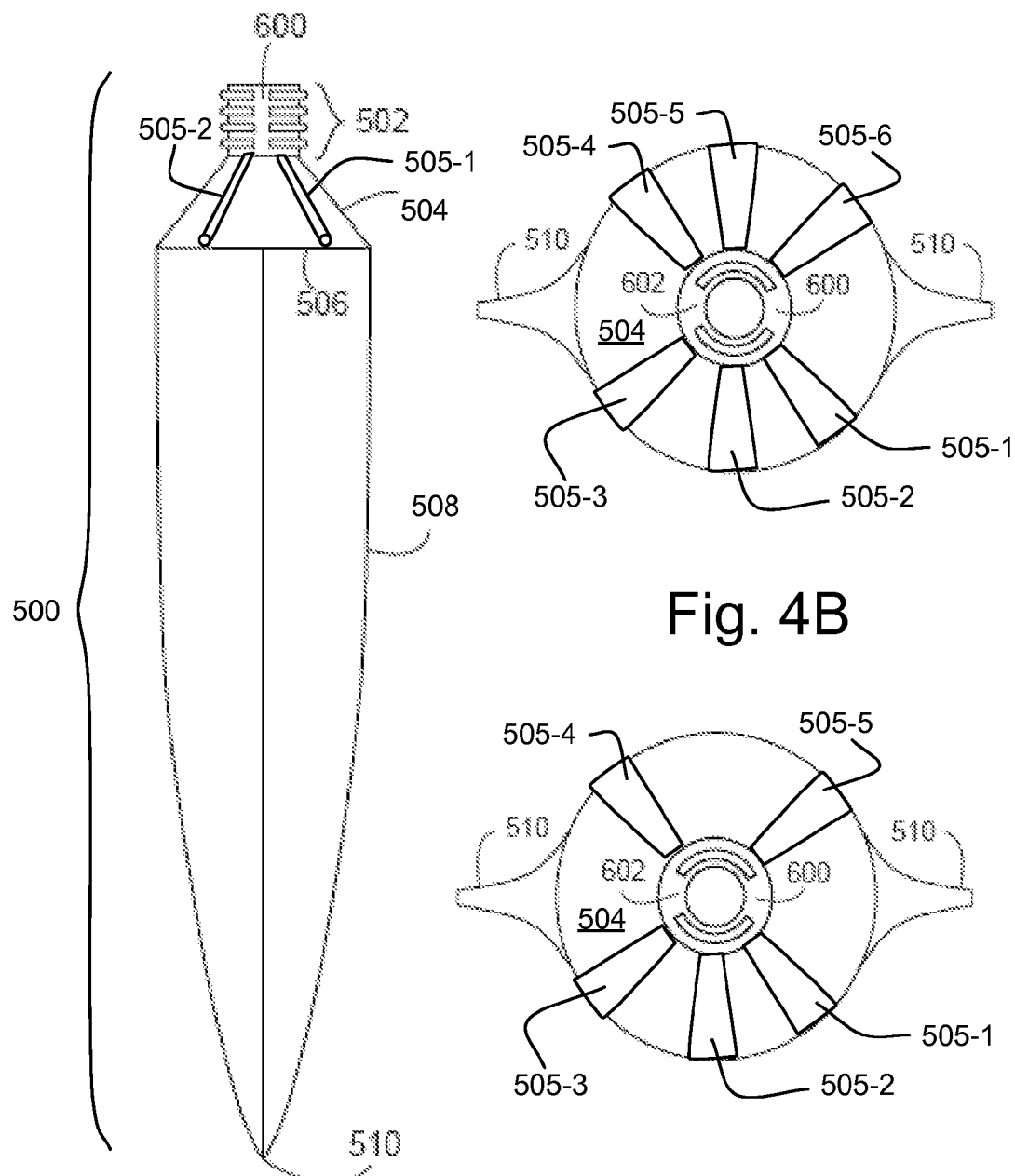
FIG. 4A shows a side view of a collapsible tube with two external raised ribs included on its flexible shoulder.
FIG. 4B shows a top view of a collapsible tube with six external raised ribs included on its flexible shoulder.
FIG. 4C shows a top view of a collapsible tube with five external raised ribs included on its flexible shoulder.

FIGS. 4A and 5A show one side of the flexible shoulder including a first external raised rib 505-1 and a second external raised rib 505-2, which when the flexible shoulder is symmetric with its other side, would thus include four external raised ribs. In certain embodiments, this may be a preferred configuration.

FIG. 4B shows the flexible shoulder including more than four external raised ribs, in fact including a first external raised rib 505-1, a second external raised rib 505-2, a third external raised rib 505-3, a fourth external raised rib 505-4, a fifth external raised rib 505-5 and a sixth external raised rib 505-6.

FIG. 4C shows the flexible shoulder including an odd number of external raised ribs, in fact including a first external raised rib 505-1, a second external raised rib 505-2, a third external raised rib 505-3, a fourth external raised rib 505-4, and a fifth external raised rib 505-5.

Various embodiments of the flexible shoulder may have an even or odd number of external or internal raised ribs. The number these internal and/or external raised ribs may further be at most twenty four.

Using the collapsible tube 500 permits dispensing essentially all of the contained product 900 as shown in FIG. 6A to 6D, which is advantageous in a variety of fields where today everyone is forced to waste the last part of the contained product. The contained product may be any of the following: a pharmaceutical, a personal care product, a toothpaste, a food, an artist's paint, a glue, a hazardous chemical, a grease product, and/or a viscous plastic.

A contained product 900 will be referred to herein as a viscous plastic product when it is viscous enough to be pressed out of a collapsible squeeze tube to form a blob or a line for various purposes, such as caulk or other sealants, a compound used to create a braille letter, or other identifying mark on items for the blind, or a decorative substance that is not simply paint but creates texture and mass when applied, or at least one compound that dries when exposed to air forming durable shapes, marks, seals, decorations, and the like.

The collapsible tube 500 may preferably be made of at least one flexible thermoset elastomeric and/or flexible thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. The cap 800 to which the flexible threads mate may also be manufactured using existing collapsible tube manufacturing technology and materials.

Aspects of the invention include manufacturing the collapsible tube 500 with the flexible shoulder 504 including the raised detent 512 by molding a first injected material to create the collapsible tube with the raised detent included in the flexible shoulder. Certain embodiments of the invention include the collapsible tube with the raised detent as a product of this manufacturing process.

Another aspect of the invention includes manufacturing the collapsible tube 500 with the raised flexible ribs 505 by molding the first injected material to create the collapsible tube with the raised flexible ribs included in the flexible shoulder 504. Certain embodiments of the invention include the collapsible tube with the flexible ribs as a product of this manufacturing process.

As used herein, the first injected material may but is not limited to, at least one thermoset elastomeric and/or thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds.

Other manufacturing processes may be used to make embodiments of the collapsible tube 500. The threads on the flexible throat 502, the flexible shoulder 504, and when applicable, the collapsible tube body 506, are preferably made of flexible materials including, but are not limited to, at least one thermoset elastomeric and/or thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds.

An elastomeric plastic is typically a polymer blend or compound, which above its melting temperature, exhibits a thermoplastic behavior enabling it to be shaped into a fabricated article, such as a collapsible tube or cap. When the article is within its design temperature range, it exhibits elastomeric behavior without cross-linking during fabrication. The fabrication process is reversible. The article can be reprocessed and remolded. The method of making these collapsible tubes 500 may include, but is not limited to, using a mold, into which the material(s) are injected and/or blown. The material may be injected one or more times. When material is injected more than one time, the process is often known as a multi-shot molding.

Certain embodiments include a cap 800 for the collapsible tube 500 as shown in FIGS. 7A to 9D, including an interior bulge 802 to act upon the flexible throat 502 as shown in FIG. 7C or an interior rim 822 to act upon the flexible throat as shown in FIG. 7B. Both the interior bulge 802 and interior rim 822 act upon the flexible throat 502 to urge the flexible throat to engage the internal thread form 804-1 to 804-N, where in these two examples N is four.

The cap 800, for the collapsible tube 500 with the flexible shoulder 504 including the raised detent 512, may include a lower surface 830 to engage with the raised detent to stop the cap from twisting past the final position as shown in FIGS. 7A to 7C.

Figure 8A:
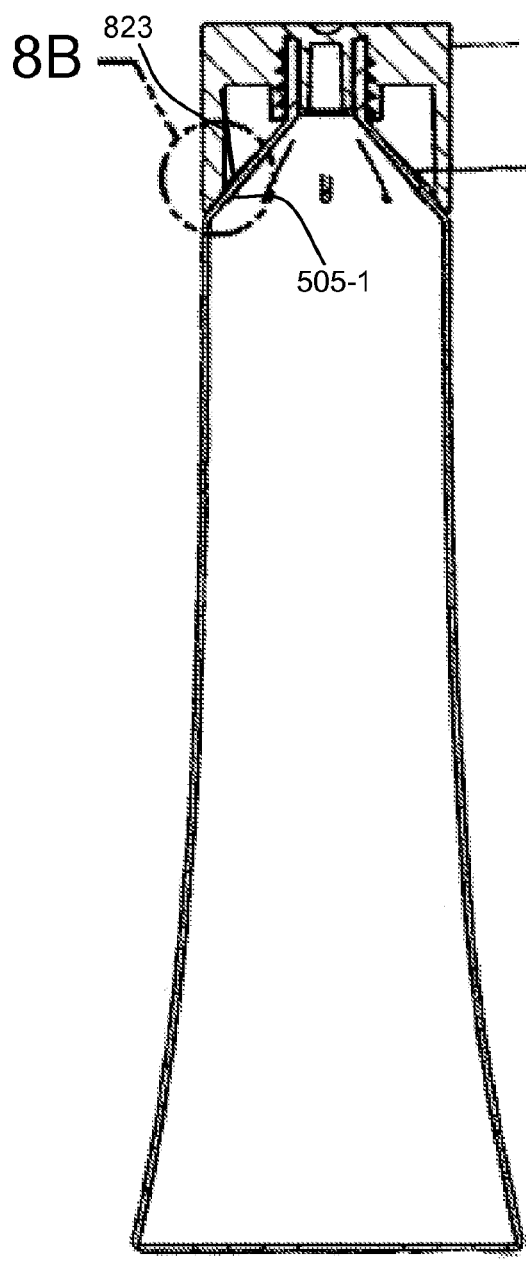
FIGS. 8A and 8B show an internal post in the cap engaging with a raised rib on the flexible shoulder of the collapsible tube.
Figure 8B:
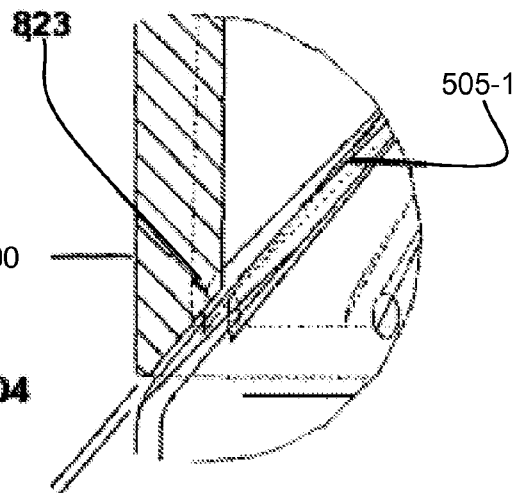

The cap 800, for the collapsible tube 500 with the flexible shoulder 504 including raised flexible ribs 505, may include an internal post 823 that snaps over a raised flexible rib 505-1 to indicate the cap turning is in the final position as shown in FIGS. 8A and 8B.

The cap 800 may include a bump 824 engaging the gap 514 in the raised detent 512 as the cap is turned into the final position, producing a cue indicating to the user that the final position has been reached, as shown in FIGS. 9A through 9D. The may include the internal post 823 as shown in FIGS. 9A and 9B, or may not include the internal post as shown in FIGS. 9C and 9D.

In further detail, FIG. 7C shows a cross section of FIG. 7A of the collapsible shoulder 504, flexible throat 502 engaging the internal thread form and the external flexible thread form. The internal thread form includes internal buttress threads 804-1 to 804-4. The external flexible thread form includes external buttress threads 702-1 to 702-4. The internal thread form and the external flexible thread form collectively urge the cap 800 and the flexible throat 502 to seal the contained product into the collapsible tube. The cap 800 further, preferably includes an interior bulge 802 which acts upon the flexible throat 502 to urge the flexible throat 502 to engage the internal thread form and the external flexible thread form.

In FIGS. 7B and 7C, the internal thread form of the cap 800 slides along the external flexible thread form of the collapsible tube, and the external flexible thread form slides along the internal thread form to slide along each other, when the internal thread form and the external flexible thread form engage. After they engage, continued sliding causes the internal thread form and the external flexible thread form to seal the contained product 900 into the collapsible tube 500.

In FIG. 7B, the interior rim 822 included in the cap 800 may preferably extend to below at least the first external thread 804-1 to aid in urging the reforming of the flexible throat 502. It may further preferred that the interior rim 822 extend below the second external thread 804-2, and so on. One skilled in the art will recognize that many variations in the cap 800 are preferred in different situations, causing variation in at least their size, shape, number of threads, and whether or not they are hollow.

The cap 800 shown in the preceding Figures may preferably be made from the second injected material containing at least one rigid thermoset elastomeric and/or rigid thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. The cap to which the flexible threads mate may also be manufactured using existing cap molding technology and materials. The interior bulge 802 on the cap that inserts into the flexible throat 502 may also be a standard cap design. The interior rim 822 on the cap that inserts into the flexible throat 502 may also be a standard cap design. These caps may also be made from conventional cap materials.

Aspects of the invention include manufacturing the cap 800 for collapsible tube 500 with the raised detent 512 on the flexible shoulder 504 by molding a second injected material to create the cap including the lower surface for engaging the raised detent on the flexible shoulder 504 of the collapsible tube. Certain embodiments include the cap with the lower surface as a product of this process.

Other aspects of the invention include manufacturing the cap 800 for the collapsible tube 500 with a flexible shoulder 504 including raised ribs by either molding the second material to create the cap with the internal rib for snapping over the raised flexible ribs 505 or to create the cap with the internal post for snapping over the raised flexible ribs. Either of these caps are products of this process.

In further detail, FIG. 2A shows a side view of the collapsible tube 500 showing a first break 600 forming a canted column on the flexible throat 502. FIGS. 2B and 2C show a top view of the collapsible tube 500 including a first break 600 and a second break 602. FIGS. 2A and 3A shows a side view of the collapsible tube 500 with the first break 600 forming rectangular column on the flexible throat.

FIGS. 2A and 2D show the flexible throat 502 with an external flexible thread form including at least two, and in this case four open threads. These threads could, be by way of example, external acme threads, external buttress threads, external V threads, external box threads, or combinations or modifications of these well known open threads. The first break 600 in FIG. 2A forms a canted column on the flexible throat 502. The first break 600 is rectangular on the flexible throat in FIG. 2D.

The collapsible tube 500 may have a tube closure, repeatedly opened and sealed shut by using a mechanical device (sometimes known as a key). Versions of key typically include a plastic cylinder with a slit in its center that slides over the open end of the tube, rolls toward the flexible throat 504 of the collapsible tube 500 to seal the tube closure, and locks itself in the closed position.

The preceding embodiments have been provided by way of example and are not meant to constrain the scope of the following claims.

What is claimed is:

1. A collapsible tube for containing at least one product, comprising:
    an external flexible thread form on a flexible throat coupled to a flexible shoulder,
    with said flexible throat and said flexible shoulder configured to flatten to dispense essentially all of said product, said flexible shoulder comprises
a raised detent near the widest circumference of said flexible shoulder that stops a cap when twisted onto said flexible throat at a final position.

2. The collapsible tube of claim 1, further comprising:
said flexible shoulder mating to a collapsible tube body;
wherein said flexible throat and said flexible shoulder flatten with said collapsible tube body to dispense essentially all of said product.

3. The collapsible tube of claim 1, further comprising: said flexible shoulder mating to itself.

4. The collapsible tube of claim 1, wherein said raised detent comprises: a raised rim near said widest circumference sufficient to create a barrier to said cap turning beyond when said cap is in said final position.

5. The collapsible tube of claim 1, wherein said raised detent comprises at least one gap for engaging with a bump on said cap to create a cue indicating to a user that said final position has been reached.

6. The collapsible tube of claim 1, wherein said contained product is a member of the group consisting of a pharmaceutical product, a personal care product, a paint product, a toothpaste, a food product, a glue product, a hazardous chemical, a grease product, and a viscous plastic product.

7. The collapsible tube of claim 1, wherein said flexible shoulder comprises at least two raised flexible ribs to control the flattening of said flexible shoulder in a single direction.

8. The collapsible tube of claim 7, wherein said flexible shoulder further comprises at least two of an external of said raised flexible ribs.

9. The collapsible tube of claim 7, wherein said flexible shoulder further comprises at least two of an internal of said raised flexible ribs.

10. The combination of said collapsible tube and said cap of claim 1, wherein said cap comprises:
an internal thread form configured to mate with said external thread form on said flexible throat to urge said flexible throat to seal against said cap when said cap is twisted onto said flexible throat;
a lower surface to engage with said raised detent to stop said cap from twisting past said final position; and
further comprising a member of the group consisting of:
an interior bulge to act upon said flexible throat to urge said flexible throat to engage said internal thread form and said external flexible thread form; and
an interior rim to act upon said flexible throat to urge said flexible throat to engage said internal thread and said external flexible thread form.

11. A method of manufacturing a collapsible tube, wherein said method comprises: a step of said collapsible tube containing at least one product, wherein an external flexible thread is formed on a flexible throat and coupled to a flexible shoulder, with said flexible throat and said flexible shoulder configured to flatten to dispense essentially all of said product, said flexible shoulder comprises a raised detent near the widest circumference of said flexible shoulder molding a first injected material to create said collapsible tube with said raised detent included in said flexible shoulder.

12. A collapsible tube with said raised detent made by the process of claim 11.

13. A collapsible tube for containing at least one product, comprising:
a flexible throat including an external flexible thread form, with said flexible throat coupled to a flexible shoulder including at least two raised flexible ribs to control the flattening of said flexible shoulder in a single direction, with said flexible throat and said flexible shoulder configured to flatten to dispense essentially all of said product, with said external flexible thread form configured to mate with an internal thread form, included in a cap, by urging said flexible throat to seal against said cap when said cap is twisted onto said flexible throat; and
wherein said external flexible thread form further comprises: at least two external open threads.

14. The collapsible tube of claim 13, further comprising:
said flexible shoulder mating to a collapsible tube body;
wherein said flexible throat and said flexible shoulder flatten with said collapsible tube body to dispense essentially all of said product.

15. The collapsible tube of claim 13, further comprising: said flexible shoulder mating to itself.

16. The collapsible tube of claim 13, wherein said flexible shoulder further comprises at least four of an external of said raised flexible ribs.

17. The collapsible tube of claim 13, wherein said flexible shoulder further comprises at least four of an internal of said raised flexible ribs.

18. The collapsible tube of claim 13, wherein said contained product is a member of the group consisting of a pharmaceutical product, a personal care product, a paint product, a toothpaste, a food product, a glue product, a hazardous chemical, a grease product, and a viscous plastic product.

19. The collapsible tube of claim 13, wherein said flexible shoulder further comprises a raised detent near the widest circumference of said flexible shoulder that stops said cap when twisted onto said flexible throat at a final position.

20. The collapsible tube of claim 19, wherein said raised detent comprises: a raised rim of flexible material near said widest circumference sufficient to create a barrier to said cap turning beyond when said cap is in said final position.

21. The combination of said collapsible tube and said cap of claim 13, wherein said cap comprises:
an internal post with sufficient length to snap over said raised flexible ribs of said flexible throat as said cap is turned into said final position, producing a cue indicating to the user that said final position has been reached;
wherein said cue includes at least one member of the group consisting of an auditory cue and a tactile cue; and
wherein said cap, further comprises a member of the group consisting of:
an interior bulge to act upon said flexible throat to urge said flexible throat to engage said internal thread form and said external flexible thread form; and
an interior rim to act upon said flexible throat to urge said flexible throat to engage said internal thread and said external flexible thread form.

22. A method of manufacturing a collapsible tube, wherein said method comprises the step of: the collapsible tube containing at least one product, wherein a flexible throat includes an external flexible thread formed with said flexible throat that is coupled to a flexible shoulder which includes at least two raised flexible ribs to control the flattening of said flexible shoulder in a single direction; and wherein said external flexible thread form further comprises, at least two external open threads
molding a first injected material to create said collapsible tube with said raised flexible ribs included in said flexible throat.

23. The collapsible tube with said raised flexible ribs made by the process of claim 22.

* * * * *